US012664220B2

(12) United States Patent
Flores

(10) Patent No.: US 12,664,220 B2
(45) Date of Patent: Jun. 23, 2026

(54) SYSTEMS AND METHODS FOR AI-BASED CONTENT EXTRACTION AND GENERATION

(71) Applicant: YAHOO ASSETS LLC, New York, NY (US)

(72) Inventor: Aaron Flores, Milpitas, CA (US)

(73) Assignee: YAHOO ASSETS LLC, New York, NY (US)

( * ) Notice: Subject to any disclaimer, the term of this patent is extended or adjusted under 35 U.S.C. 154(b) by 4 days.

(21) Appl. No.: 18/539,521

(22) Filed: Dec. 14, 2023

(65) Prior Publication Data

US 2025/0200118 A1 Jun. 19, 2025

(51) Int. Cl.
*G06F 16/95* (2019.01)
*G06F 16/951* (2019.01)
*G06F 40/20* (2020.01)

(52) U.S. Cl.
CPC ............ *G06F 16/951* (2019.01); *G06F 40/20* (2020.01)

(58) Field of Classification Search
CPC ...................................................... G06F 16/951
USPC ......................................................... 707/709
See application file for complete search history.

(56) References Cited

U.S. PATENT DOCUMENTS

2024/0248963 A1 * 7/2024 Parham ............... G06F 18/2415
2024/0256592 A1 * 8/2024 O'Neill ................. G06F 16/483
2025/0029603 A1 * 1/2025 Gopalakrishnan .... G10L 15/063

* cited by examiner

*Primary Examiner* — Syling Yen
(74) *Attorney, Agent, or Firm* — James J. DeCarlo; Greenberg Traurig, LLP

(57) ABSTRACT

Disclosed are systems and methods that provide a decision-intelligence (DI)-based, computerized framework for deterministically identifying and extracting content from network resources, and generating focused content based therefrom for delivery to electronic users. The framework enables real-time customization of extraction tasks, which can cause tailored, accurate results that are contextually relevant and tied into the purpose of the extraction task. This data can then be compiled and/or leveraged to generate content campaigns that can target specific sets of users, geographies, time periods, trends and the like. The framework can leverage a large language model (LLM) to seamlessly extract relevant information from network resources, which enables the generation and execution of extraction requests that can be dynamically executed and updated, which can enable the framework to "drill-down" on contextual and/or topical aspects of categories of data.

17 Claims, 6 Drawing Sheets

100

300

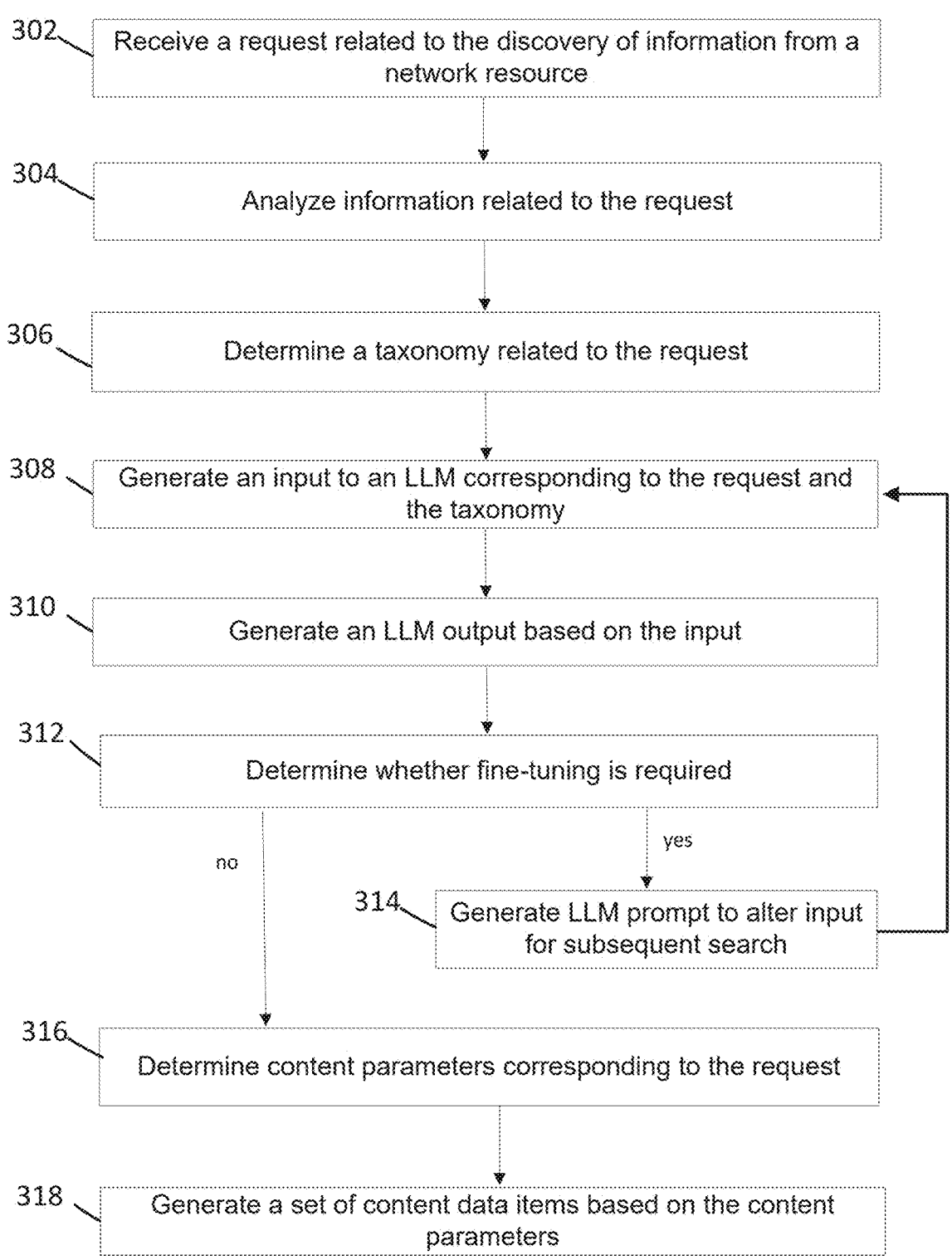

302 — Receive a request related to the discovery of information from a network resource 304 — Analyze information related to the request 306 — Determine a taxonomy related to the request 308 — Generate an input to an LLM corresponding to the request and the taxonomy 310 — Generate an LLM output based on the input 312 — Determine whether fine-tuning is required yes no 314 — Generate LLM prompt to alter input for subsequent search 316 — Determine content parameters corresponding to the request 318 — Generate a set of content data items based on the content parameters

FIG. 3

SYSTEMS AND METHODS FOR AI-BASED CONTENT EXTRACTION AND GENERATION

FIELD OF THE DISCLOSURE

The present disclosure is generally related to content generation and management, and more particularly, to a decision intelligence (DI)-based computerized framework for deterministically identifying and extracting content from network resources, and generating targeted content based therefrom for delivery to electronic users.

BACKGROUND

Extracting content from network resources (e.g., websites) typically involves web scraping, which is a process in which tools or bots can gather information from webpages. For example, Hypertext Transport Protocol (HTTP) requests can be sent to a website, for which data can be extracted from the Hypertext Markup Language (HTML) of the website.

SUMMARY OF THE DISCLOSURE

However, conventional scraping and/or network resource extraction techniques fall short. That is, the conventional approach of performing generic web scraping of network resources is devoid of any deference towards the requestor, the request and/or any contextual information related to the purpose of the scaping operation. That is, current scraping tools are incapable of capturing dynamic content, and the data quality and accuracy of resultant extraction can lead to inconsistencies and/or inaccuracies in the data actually obtained. Moreover, data may be "noisy", in that it may be irrelevant to the task at hand.

By way of example, an extraction task of a fashion website may request performed in an ad-hoc manner, in that broad protocols may define an extraction, which can lead inaccurate results. For example, a request for information about "women's sunglasses" on a department store website may result in information generally related to "women's fashion", which is beyond the scope of the intended task.

To that end, the disclosed systems and methods provide a novel computerized data extracting and generation framework that enables real-time customization of extraction tasks, which can cause tailored, accurate results that are contextually relevant and tied into the purpose of the extraction task. This data, as discussed below, can then be compiled and/or leveraged to generate content campaigns that can target specific sets of users, geographies, time periods, trends and the like.

For example, the disclosed framework can curate and execute an extraction task of the department store's website so that only "high-end" women's fashion sunglasses are identified, from which, the associated data/metadata can be retrieved.

Accordingly, in some embodiments, the disclosed framework can leverage a large language model (LLM) to seamlessly extract relevant information from network resources (e.g., websites, webpages, applications, portals, data repositories, a cloud, and the like). As discussed herein, implementation of an LLM (and/or any other form of artificial intelligence (AI) and/or machine learning (ML) model) can generate extraction requests that can be dynamically executed and updated, which can enable the framework to "drill-down" on contextual and/or topical aspects of categories of data. This, as evidenced from the below discussion, can provide customized feature extraction mechanisms for individuals to harness. Thus, rather than leveraging generic tools to obtain data about a topic or category (e.g., a taxonomy), the disclosed systems and methods provide novel technicality that can optimize how extractions can be performed, thereby increasing their accuracy and improving how efficiently requesters can obtain the information being sought.

The latest versions of LLMs have, among other features and capabilities, theory of mind, abilities to reason, abilities to make a list of tasks, abilities to plan and react to changes (via reviewing their own previous decisions), abilities to understand multiple data sources (and types of data-multi-modal), abilities to have conversations with humans in natural language, abilities to adjust, abilities to interact with and/or control application program interfaces (APIs), abilities to remember information long term, abilities to use tools (e.g., read multiple schedules/calendars, command other systems, search for data, and the like), abilities to use other LLM and other types of AI/ML (e.g., neural networks to look for patterns, recognize humans, pets, and the like, for example), abilities to improve itself, abilities to correct mistakes and learn using reflection, and the like.

Thus, as provided herein, the disclosed integration of such LLM technology to execute the disclosed scraping and content generation therefrom provides an improved system that can enable the creation of new forms of digital content, while reaching an expanded set of users, inter alia.

According to some embodiments, a method is disclosed for a DI-based computerized framework for deterministically identifying and extracting content from network resources, and generating targeted content based therefrom for delivery to electronic users. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for deterministically identifying and extracting content from network resources, and generating targeted content based therefrom for delivery to electronic users.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 3 illustrates an exemplary workflow according to some embodiments of the present disclosure;

DETAILED DESCRIPTION

Figure 1:
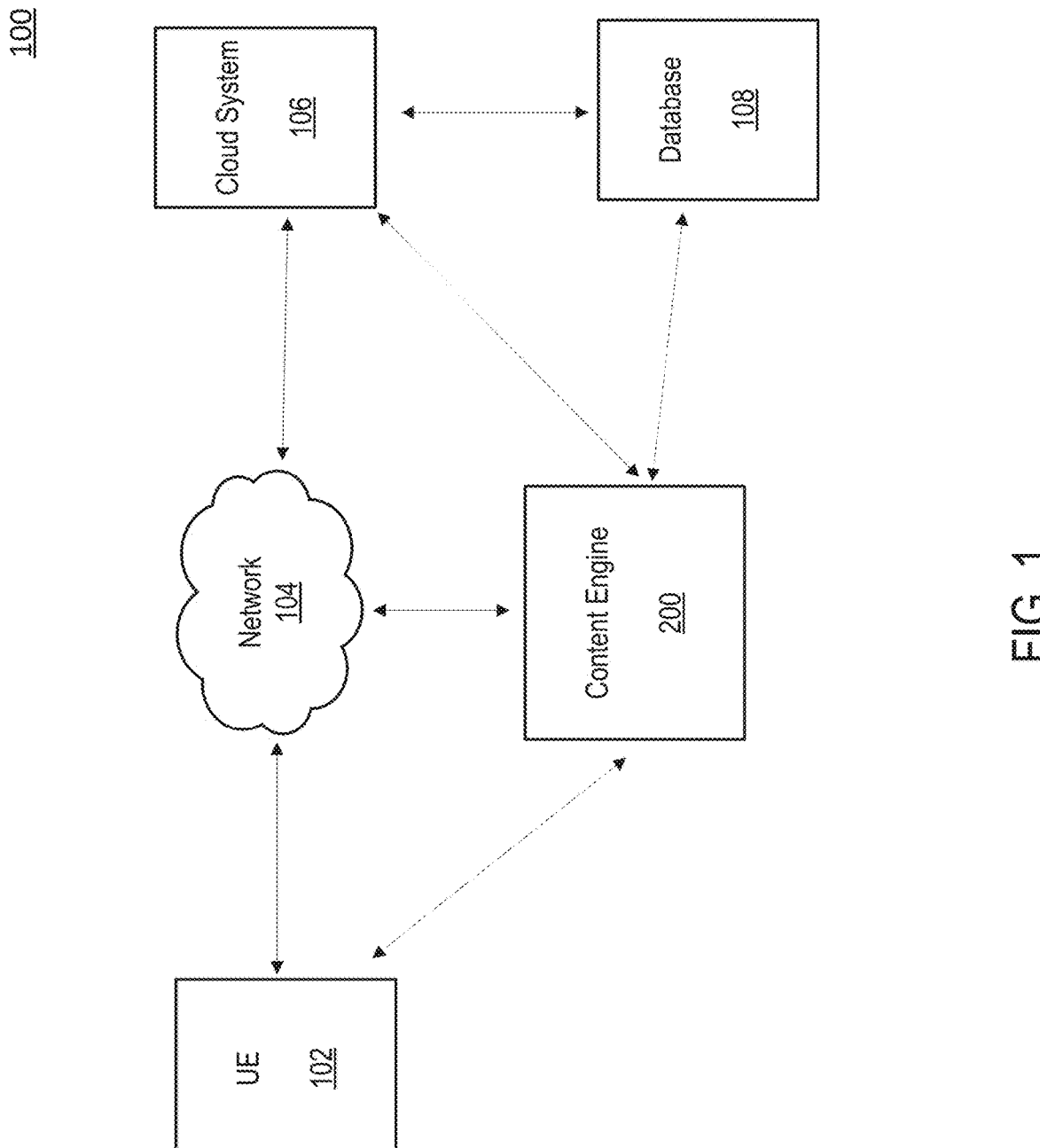
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. With reference to FIG. 1, system 100 is depicted which includes user equipment (UE) 102 (e.g., a client device, as mentioned above and discussed below in relation to FIG. 6), network 104, cloud system 106, database 108, and content engine 200. It should be understood that while system 100 is depicted as including such components, it should not be construed as limiting, as one of ordinary skill in the art would readily understand that varying numbers of UEs, peripheral devices, cloud systems, databases, network resources, engines and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, Internet of Things (IoT) device, autonomous machine, and any other device equipped with a cellular or wireless or wired transceiver. For example, UE 102 can be associated with a device on network 104, which is performing operations for generating an ad campaign, inclusive of the digital objects that make up the campaign, that will be delivered to other UEs on the network.

In some embodiments, a peripheral device (not shown) can be connected to UE 102, and can be any type of peripheral device, such as, but not limited to, a wearable device (e.g., smart watch), printer, speaker, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a network platform (e.g., Yahoo!®), which has associated network resources hosted on the internet or private network (e.g., network 104), which enables (via engine 200) the content extraction and generation discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE, and the services and applications provided by cloud system 106 and/or content engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 4:
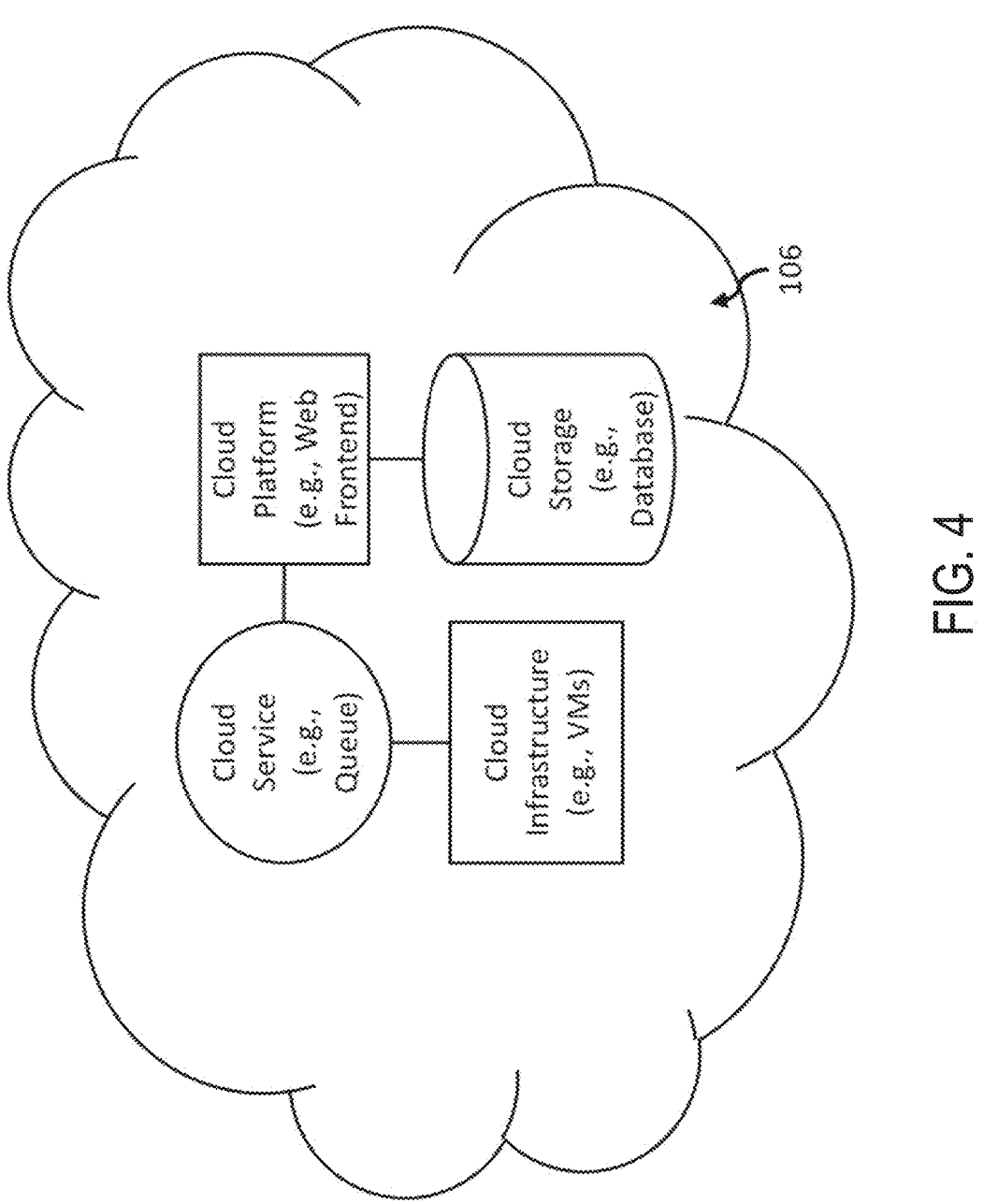
FIG. 4 depicts an exemplary implementation of an architecture according to some embodiments of the present disclosure.
Figure 5:
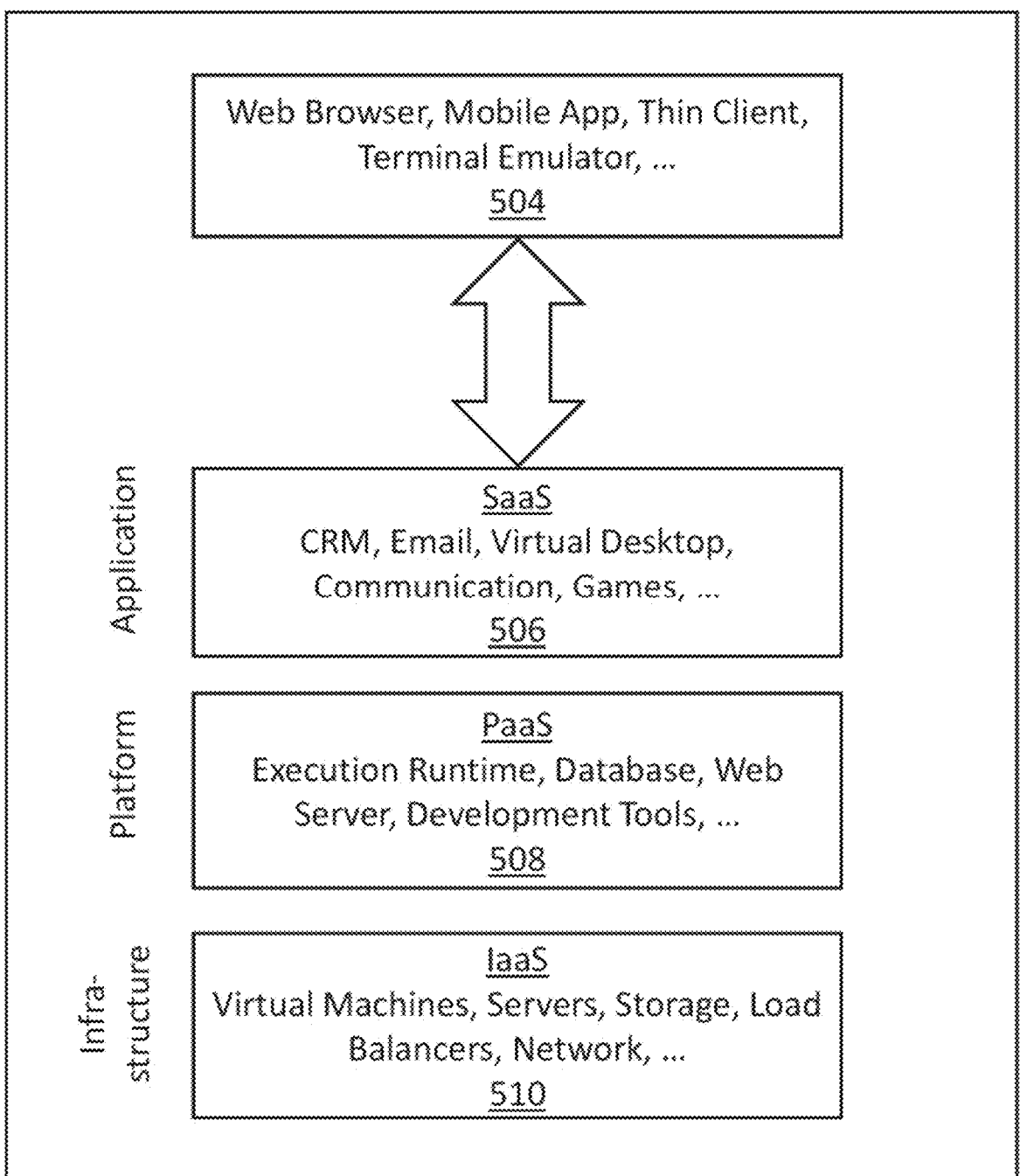
FIG. 5 depicts an exemplary implementation of an architecture according to some embodiments of the present disclosure.

Turning to FIG. 4 and FIG. 5, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 510, platform as a service (PaaS) 508, and/or software as a service (SaaS) 506 using a web browser, mobile app, thin client, terminal emulator or other endpoint 504. FIG. 4 and FIG. 5 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository Content engine 200, as discussed above and further below in more detail, can include components for the disclosed functionality. According to some embodiments, content engine 200 may be a special purpose machine or processor, and can be hosted by a device on network 104, within cloud system 106, and/or on UE 102. In some embodiments, engine 200 may be hosted by a server and/or set of servers associated with cloud system 106.

According to some embodiments, as discussed in more detail below, content engine 200 may be configured to implement and/or control a plurality of services and/or microservices, where each of the plurality of services/microservices are configured to execute a plurality of workflows associated with performing the disclosed content extraction and/or generation management. Non-limiting embodiments of such workflows are provided below in relation to at least FIG. 3.

According to some embodiments, as discussed above, content engine 200 may function as an application provided by cloud system 106. In some embodiments, engine 200 may function as an application installed on a server(s), network location and/or other type of network resource associated with system 106. In some embodiments, engine 200 may function as an application installed and/or executing on UE 102. In some embodiments, such application may be a web-based application accessed by UE 102 over network 104 from cloud system 106. In some embodiments, engine 200 may be configured and/or installed as an augmenting script, program or application (e.g., a plug-in or extension) to another application or program provided by cloud system 106 and/or executing on UE 102.

Figure 2:
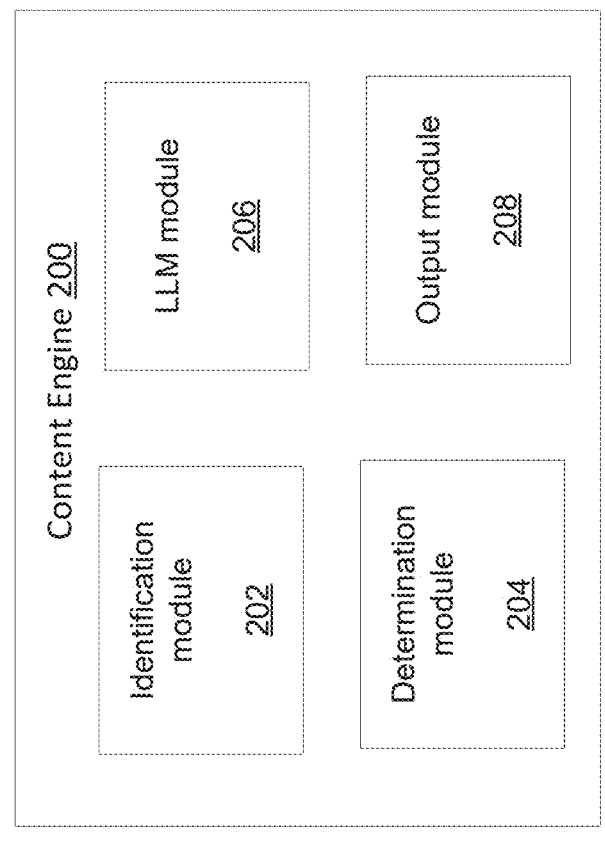
FIG. 2 is a block diagram illustrating components of an exemplary system according to some embodiments of the present disclosure.

As illustrated in FIG. 2, according to some embodiments, content engine 200 includes identification module 202, determination module 204, LLM module 206 and output module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Turning to FIG. 3, Process 300 provides non-limiting example embodiments for the disclosed content generation and management framework. As provided below, the disclosed framework's configuration and implementation can provide advancements in how contextual content impressions and/or impression opportunities can be realized for advertiser campaign performance. According to some embodiments, the framework (e.g., via engine 200) can apply a LLM(s) to contextual content information from impression opportunities of network resources (e.g., websites or applications). As discussed herein, the crawled, retrieved, scraped, mined and/or extracted information can be processed through an LLM (or LLMs) in order to extract information in a specified way, which can enable analysis models (e.g., AI/MLs, discussed supra) novel capabilities to exploit, in a flexible and dynamic manner, the information to cultivate content campaigns (e.g., generate content and/or target specific demographics).

By way of a non-limiting example, a user (e.g., advertiser X, for example) can be prompted by an LLM, for which an input can be entered: "provide the top 10 topics in website Y that are most relevant to product Z from advertiser X." As provided below, the disclosed framework can, by taking advantage of the flexibility and ease of adjusting the information extracting scheme via the LLM, parse website Y, and, in a finely tuned manner, identify a maximized amount of data that correlates to the specifically provided request via the LLM prompt.

According to some embodiments, Step 302 of Process 300 can be performed by identification module 202 of content engine 200; Steps 304, 306, 312 and 316 can be performed by determination module 204; Steps 308, 310 and 314 can be performed by LLM module 206; and Step 318 can be performed by output module 208.

According to some embodiments, Process 300 begins with Step 302 where engine 200 can receive a request related to the discovery of information from a network resource. According to some embodiments, the user can be any type of entity that can request information from a network resource, such as, but not limited to, a person(s), company, application, program, device, advertiser, and the like. In some embodiments, a network resource can be, but is not limited to, an application, website, webpage, domain, portal, cloud, server, local device, data storage, service platform, content platform, and the like.

In some embodiments, the request can be in relation to a type of network resource and/or a set of network resources. For example, the request can identify websites from two companies; and in another non-limiting example, the request can correspond to a type of website (e.g., fashion websites, for example).

According to some embodiments, the request can include information related to, but not limited to, the user, network resource, context, category, topic, type, time period, demographics, geography, and the like, or some combination thereof.

In Step 304, engine 200 can analyze the request and the information related thereto. In some embodiments, engine 200 may execute and/or include a specific trained AI/ML model, a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may leverage an LLM, whether known or to be known. As discussed above, an LLM is a type of AI system designed to understand and generate human-like text based on the input it receives. The LLM can implement technology that involves deep learning, training data and natural language processing (NLP). Large language models are built using deep learning techniques, specifically using a type of neural network called a transformer. These networks have many layers and millions or even billions of parameters. LLMs can be trained on vast amounts of text data from the internet, books, articles, and other sources to learn grammar, facts, and reasoning abilities. The training data helps them understand context and language patterns. LLMs can use NLP techniques to process and understand text. This includes tasks like tokenization, part-of-speech tagging, and named entity recognition.

LLMs can include functionality related to, but not limited to, text generation, language translation, text summarization, question answering, conversational AI, text classification, language understanding, content generation, and the like. Accordingly, LLMs can generate, comprehend, analyze and output human-like outputs (e.g., text, speech, audio, video, and the like) based on a given input, prompt or context. Accordingly, LLMs, which can be characterized as transformer-based LLMs, involve deep learning architectures that utilizes self-attention mechanisms and massive-scale pre-training on input data to achieve NLP understanding and generation. Such current and to-be-developed models can aid AI systems in handling human language and human interactions therefrom.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
    b. transfer the input data to the neural network model,
    c. train the model incrementally,
    d. determine the accuracy for a specific number of timesteps,
    e. apply the trained model to process the newly-received input data,
    f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Thus, in Step 306, based on the analysis from Step 304, engine 200 can determine a taxonomy related to the request. According to some embodiments, the taxonomy can be determined by systematically classifying and categorizing information from the request and the information therefrom (as in Step 304). According to some embodiments, information can be categorized by type, such as articles, videos, or images, as well as by topic, audience, and purpose, allowing for a nuanced understanding of its nature and intended use (e.g., intent of the request). Additionally, the taxonomy can consider the media source, publication date, geographic relevance and content format, thereby providing valuable context for an extraction task.

In some embodiments, by classifying content based on its length, author and/or source authority, language, user interaction level, accessibility features, legal and/or ethical considerations, and relevance to specific keywords or tags, the taxonomy can include a comprehensive data structure for content organization. As provided below, the taxonomy determined in Step 306 can aid in efficient content retrieval by the LLM, enabling the location of information that aligns with their specific needs and preferences (from the request).

In Step 308, engine 200 can generate a prompt via the LLM(s), whereby the determined taxonomy (from Step 306) can be input. In some embodiments, the taxonomy can be generated as a text input, as discussed above (e.g., "provide top 10 topics . . . "). For example, the taxonomy can be subject to NLP so that it can be properly entered into the LLM. Thus, in some embodiments, the input to the LLM responsive to the prompt can be based on the taxonomy, which accounts for the request and the information related thereto as discussed above.

According to some embodiments, engine 200 can include functionality related to using such prompts to the LLM for providing and/or determining a degree of relevance of the content of a product/service to be advertised by an ad to the content of a specific network resource (e.g., website). For example, a prompt could state: "On a scale of 0 to 10, where 10 is the most relevant, and 0 is not relevant at all, how relevant is the product service advertised in ad A to the website W." Such prompt could be provided, for example, for each eligible ad/website pair determined by engine 200 based on a campaign and its targeting audience (e.g., network resource for ad placement and/or targeted users, inter alia). As provided below, results of such prompting can be utilized for optimization of content campaigns, ad placement and/or user targeting (e.g., see, Step 318, infra).

In Step 310, engine 200 can generate an LLM output based on the input to such prompts, as discussed above. According to some embodiments, Step 310 can involve scraping, mining and/or parsing and extracting content from the network resource (from the request identified in Step 302) via the LLM based on the input (from Step 308). Thus, as discussed herein, the implemented LLM can be integrated via a web crawling tool, such that the data from the target (e.g. network resource) can be analyzed via the LLM as the crawling tool mines the data/metadata of the target. In some embodiments, the crawling tool can collect and/or identify the raw target data, while the LLM adds a layer of language understanding and generation that can determine the relevance of such data to the request/taxonomy.

Accordingly, in Step 310, an LLM output is generated, which can be output for displaying within a user interface (UI) associated with the LLM (and stored in database 108).

In Step 312, engine 200 can determine whether the output satisfies the request (e.g., adheres, at least to a threshold similarity value to the taxonomy). Thus, engine 200 can determine whether the LLM input and scraping/crawling of the network resource requires another iteration at a finer-tuned value (e.g., fine-tune the LLM prompt input). According to some embodiments, engine 200 can perform such determination via at least one of the AI/ML computational analysis techniques discussed above. In some embodiments, fine-tuning can be determined via user input, in that the requestor (from Step 302) can request another iteration of Step 308, with a different LLM prompt input.

Thus, in some embodiments, when Step 312 results in a determination that a finer-tuned response (or more accurate response) is required, processing can proceed to Step 314. In Step 314, engine 200 can generate an LLM prompt that can enable the alteration and/or entry of a new/different/modified LLM input. Such LLM prompting and input can be performed in a similar manner as discussed above, at least with respect to Steps 306 and 308. For example, engine 200 can execute Step 306 to determine a modified taxonomy, which can be further based on the indication that the previous taxonomy was inaccurate (e.g., too broad, too narrow, too granular, off-topic, and the like, or some combination thereof). Accordingly, Step 314 can be recursively performed until a satisfactory LLM output is generated.

In some embodiments, when the LLM extraction results from Step 310 are determined to be satisfactory (e.g. by satisfying the threshold similarity value and/or via user input, discussed supra, as in Step 312), engine 200 can proceed to Step 316, where a determination of content parameters corresponding to the request can be performed. The parameter can correlate to a type and/or form of digital content for an content campaign, as provided below.

Accordingly, in some embodiments, Step 316 can involve engine 200 leveraging the extracted content from Step 310 to determine parameters (or features, characteristics or attributes) of the content that can be identified, compiled and/or generated in response to the request. Such parameters can be stored in database 108. In some embodiments, the extracted content can be input in the AI/ML models, as discussed above, to generate the content parameters. In some embodiments, an LLM can be utilized in a similar manner.

And, in Step 318, engine 200 can generate a set of content data items based on the content parameters. The generated content can be curated, identified and/or newly created content for an ad campaign. The campaign can be aligned according to specific criteria, such that particular user-bases and/or types of impressions can be effectuated/caused. Thus, for example, the parameters from Step 316 can be utilized to customize how an advertiser will organize and configure a set of digital advertisements on the network (e.g., where and/or when to be displayed, and what is to be displayed).

According to some embodiments, as discussed above, outputs of the LLM (e.g. which can include, but are not limited to, the taxonomy and specific values for a website or ad), and/or information related to the content data items can be compiled as an input(s) to engine 200, which via the AI/ML techniques discussed above, can be configured to use such inputs and compute a probability of users clicking and/or converting after a specific ad is provided in a placement. In some embodiments, such probabilities can be used to compute and optimize bids that the DSP can submit to ad exchanges on behalf of a specific campaign to acquire the advertising slots to place the ad optimally, as discussed herein.

Thus, as discussed above, the disclosed framework's implementation of the steps of Process 300 can enable an advertiser to curate and execute a personalized/individualized ad campaign that can realize increased impressions and improved user experiences with targeted/recommended content. Indeed, the disclosed framework provides a scalable and increasingly granular approach to the way data extraction from network resources can be utilized for purposes of generating and providing proprietary content over a network.

Figure 6:
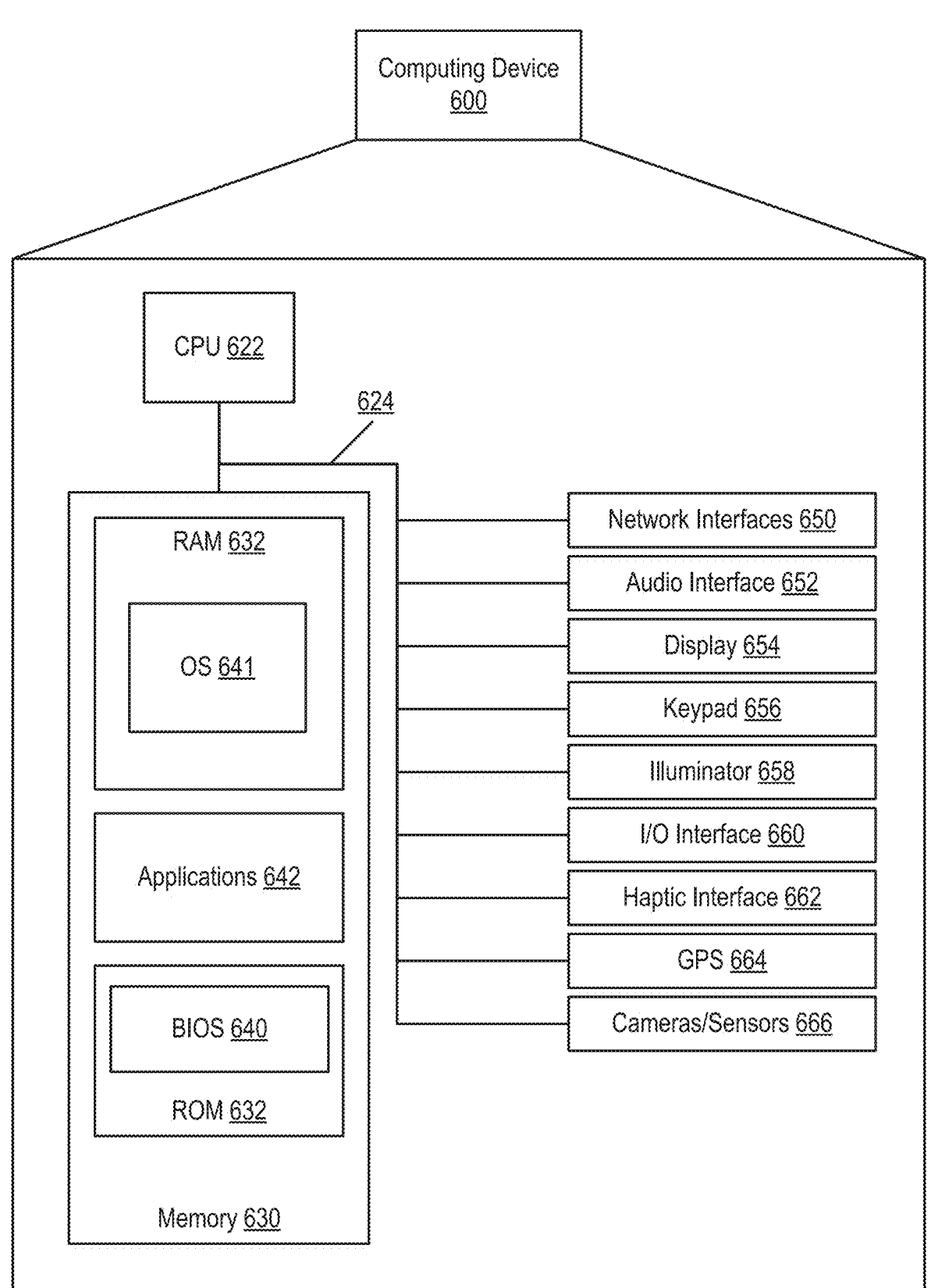
FIG. 6 is a block diagram illustrating a computing device showing an example of a client or server device used in various embodiments of the present disclosure.

FIG. 6 is a schematic diagram illustrating a client device showing an example embodiment of a client device that may be used within the present disclosure. Client device 600 may include many more or less components than those shown in FIG. 6. However, the components shown are sufficient to disclose an illustrative embodiment for implementing the present disclosure. Client device 600 may represent, for example, UE 102 discussed above at least in relation to FIG. 1.

As shown in the figure, in some embodiments, Client device 600 includes a processing unit (CPU) 622 in communication with a mass memory 630 via a bus 624. Client device 600 also includes a power supply 626, one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal or electromagnetic sensors 666. Device 600 can include one camera/sensor 666, or a plurality of cameras/sensors 666, as understood by those of skill in the art. Power supply 626 provides power to Client device 600.

Client device 600 may optionally communicate with a base station (not shown), or directly with another computing device. In some embodiments, network interface 650 is sometimes known as a transceiver, transceiving device, or network interface card (NIC).

Audio interface 652 is arranged to produce and receive audio signals such as the sound of a human voice in some embodiments. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may include any input device arranged to receive input from a user. Illuminator 658 may provide a status indication and/or provide light.

Client device 600 also includes input/output interface 660 for communicating with external. Input/output interface 660 can utilize one or more communication technologies, such as USB, infrared, Bluetooth™, or the like in some embodiments. Haptic interface 662 is arranged to provide tactile feedback to a user of the client device.

Optional GPS transceiver 664 can determine the physical coordinates of Client device 600 on the surface of the Earth, which typically outputs a location as latitude and longitude values. GPS transceiver 664 can also employ other geo-positioning mechanisms, including, but not limited to, triangulation, assisted GPS (AGPS), E-OTD, CI, SAI, ETA, BSS or the like, to further determine the physical location of client device 600 on the surface of the Earth. In one embodiment, however, Client device 600 may through other components, provide other information that may be employed to determine a physical location of the device, including for example, a MAC address, Internet Protocol (IP) address, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of Client device 600. The mass memory also stores an operating system 641 for controlling the operation of Client device 600.

Memory 630 further includes one or more data stores, which can be utilized by Client device 600 to store, among other things, applications 642 and/or other information or data. For example, data stores may be employed to store information that describes various capabilities of Client device 600. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 600.

Applications 642 may include computer executable instructions which, when executed by Client device 600, transmit, receive, and/or otherwise process audio, video, images, and enable telecommunication with a server and/or another user of another client device. Applications 642 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving, by a device, a request related to a network resource, the request comprising information related to a topic;

determining, by the device, a taxonomy based on the request, the taxonomy comprising information related to the topic and the network resource, the taxonomy indicating an organization of topical content associated with the network resource;

providing, by the device, an input to a large language model (LLM) comprising text corresponding to the taxonomy;

executing, by the device, the LLM based on the taxonomy, the execution comprising the LLM retrieving information from the network resource according to the indicated organization;

generating, by the device, via the execution of the LLM, an LLM output, the LLM output comprising a dataset extracted from the network resource via analysis of the network resource by the LLM based on the input;

analyzing, by the device, the LLM output to determine whether a fine-tuned LLM input is required, the determination corresponding to whether the extracted dataset corresponds, at least to a threshold similarity value, to the taxonomy;

generating, by the device, in response to a determination that the extracted dataset does not correspond to the taxonomy by at least the threshold similarity value, another input, the other input comprising text corresponding to a modified taxonomy, the modified taxonomy indicating an updated organization of topical content associated with the network resource;

executing, by the device, the LLM based on the other input to generate another LLM output, the other LLM output comprising another dataset extracted from the network resource via analysis of the network resource by the LLM based on the other input; and generating, by the device, a set of content items for the network resource based on the other LLM output.

2. The method of claim 1, further comprising analyzing the other LLM output to determine whether the other extracted dataset corresponds, at least to the threshold similarity value, to the modified taxonomy, wherein the generation of the set of content items is performed when the other extracted dataset satisfies the threshold similarity value.

3. The method of claim 1, further comprising:

providing an LLM prompt for the other input; and generating the other input based on the LLM prompt.

4. The method of claim 3, wherein the LLM is provided recursive inputs until a satisfactory LLM output is generated.

5. The method of claim 1, further comprising:

analyzing the other LLM output; and determining a set of content parameters, the set of content parameters comprising indicators as to a type and form of digital content.

6. The method of claim 5, wherein the generation of the set of content items is based on the set of content parameters.

7. The method of claim 1, further comprising:

analyzing the request via an executed artificial intelligence/machine learning model; and determining information related to the request, the topic and a requestor, the determined information providing an intent of the request, wherein the determination of the taxonomy is based on the determined information related to the request.

8. A device comprising:

a processor configured to:

receive a request related to a network resource, the request comprising information related to a topic;

determine a taxonomy based on the request, the taxonomy comprising information related to the topic and the network resource, the taxonomy indicating an organization of topical content associated with the network resource;

provide an input to a large language model (LLM) comprising text corresponding to the taxonomy;

execute the LLM based on the taxonomy, the execution comprising the LLM retrieving information from the network resource according to the indicated organization;

generate, via the execution of the LLM, an LLM output, the LLM output comprising a dataset extracted from the network resource via analysis of the network resource by the LLM based on the input;

analyze the LLM output to determine whether a fine-tuned LLM input is required, the determination corresponding to whether the extracted dataset corresponds, at least to a threshold similarity value, to the taxonomy;

generate, in response to a determination that the extracted dataset does not correspond to the taxonomy by at least the threshold similarity value, another input, the other input comprising text corresponding to a modified taxonomy, the modified taxonomy indicating an updated organization of topical content associated with the network resource;

execute the LLM based on the other input to generate another LLM output, the other LLM output comprising another dataset extracted from the network resource via analysis of the network resource by the LLM based on the other input; and generate a set of content items for the network resource based on the other LLM output.

9. The device of claim 8, wherein the processor is further configured to analyze the other LLM output to determine whether the other extracted dataset corresponds, at least to the threshold similarity value, to the modified taxonomy, wherein the generation of the set of content items is performed when the other extracted dataset satisfies the threshold similarity value.

10. The device of claim 8, wherein the processor is further configured to:

provide an LLM prompt for the other input; and generate the other input based on the LLM prompt.

11. The device of claim 8, wherein the processor is further configured to:

analyze the other LLM output; and determine a set of content parameters, the set of content parameters comprising indicators as to a type and form of digital content, wherein the generation of the set of content items is based on the set of content parameters.

12. The device of claim 8, wherein the processor is further configured to:

analyze the request via an executed artificial intelligence/machine learning model; and determine information related to the request, the topic and a requestor, the determined information providing an intent of the request, wherein the determination of the taxonomy is based on the determined information related to the request.

13. A non-transitory computer-readable storage medium tangibly encoded with computer-executable instructions that when executed by a device, perform a method comprising:

receiving, by the device, a request related to a network resource, the request comprising information related to a topic;

determining, by the device, a taxonomy based on the request, the taxonomy comprising information related to the topic and the network resource, the taxonomy indicating an organization of topical content associated with the network resource;

providing, by the device, an input to a large language model (LLM) comprising text corresponding to the taxonomy;

executing, by the device, the LLM based on the taxonomy, the execution comprising the LLM retrieving information from the network resource according to the indicated organization;

generating, by the device, via the execution of the LLM, an LLM output, the LLM output comprising a dataset extracted from the network resource via analysis of the network resource by the LLM based on the input;

analyzing, by the device, the LLM output to determine whether a fine-tuned LLM input is required, the determination corresponding to whether the extracted dataset corresponds, at least to a threshold similarity value, to the taxonomy;

generating, by the device, in response to a determination that the extracted dataset does not correspond to the taxonomy by at least the threshold similarity value, another input, the other input comprising text corresponding to a modified taxonomy, the modified taxonomy indicating an updated organization of topical content associated with the network resource;

executing, by the device, the LLM based on the other input to generate another LLM output, the other LLM output comprising another dataset extracted from the network resource via analysis of the network resource by the LLM based on the other input; and generating, by the device, a set of content items for the network resource based on the other LLM output.

14. The non-transitory computer-readable storage medium of claim 13, further comprising analyzing the other LLM output to determine whether the other extracted dataset corresponds, at least to the threshold similarity value, to the modified taxonomy, wherein the generation of the set of content items is performed when the other extracted dataset satisfies the threshold similarity value.

15. The non-transitory computer-readable storage medium of claim 13, further comprising:

providing an LLM prompt for the other input; and generating the other input based on the LLM prompt.

16. The non-transitory computer-readable storage medium of claim 13, further comprising:

analyzing the other LLM output; and determining a set of content parameters, the set of content parameters comprising indicators as to a type and form of digital content, wherein the generation of the set of content items is based on the set of content parameters.

17. The non-transitory computer-readable storage medium of claim 13, further comprising:

analyzing the request via an executed artificial intelligence/machine learning model; and determining information related to the request, the topic and a requestor, the determined information providing an intent of the request, wherein the determination of the taxonomy is based on the determined information related to the request.

* * * * *